Sept. 1, 1959      E. ASCOLI ET AL      2,902,131
OFFICE MACHINES, PARTICULARLY TYPEWRITERS
Filed March 19, 1957      2 Sheets-Sheet 1
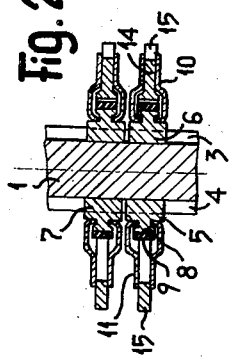
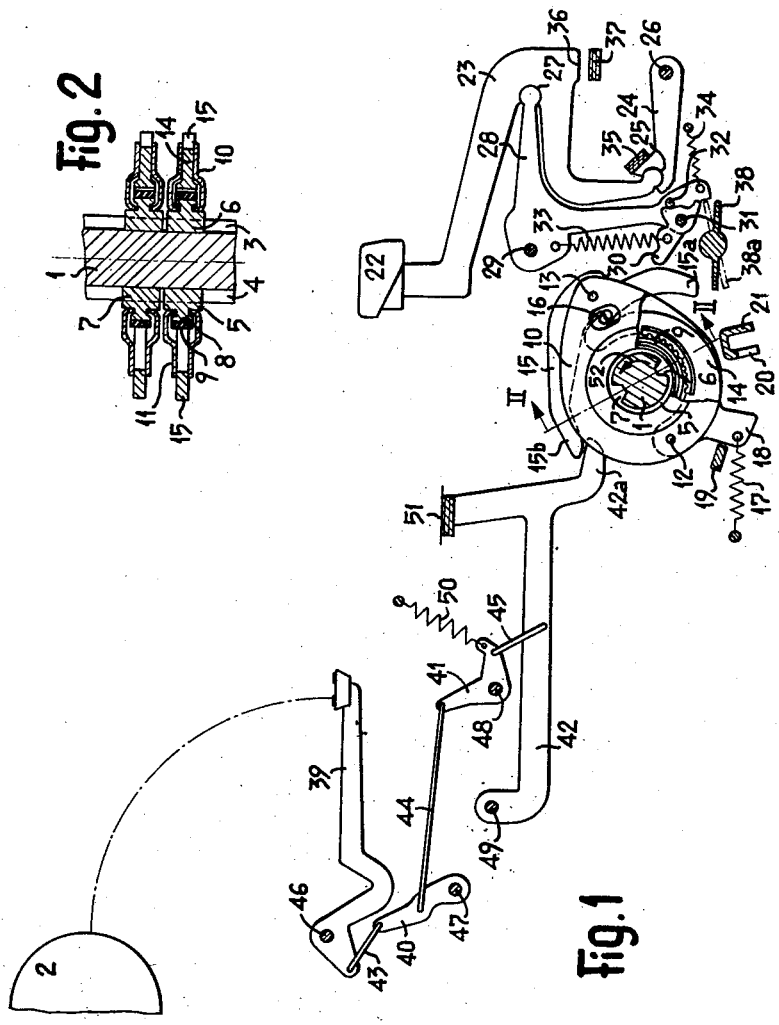
INVENTORS.
ENZO ASCOLI
NORBERT SCHAETTI

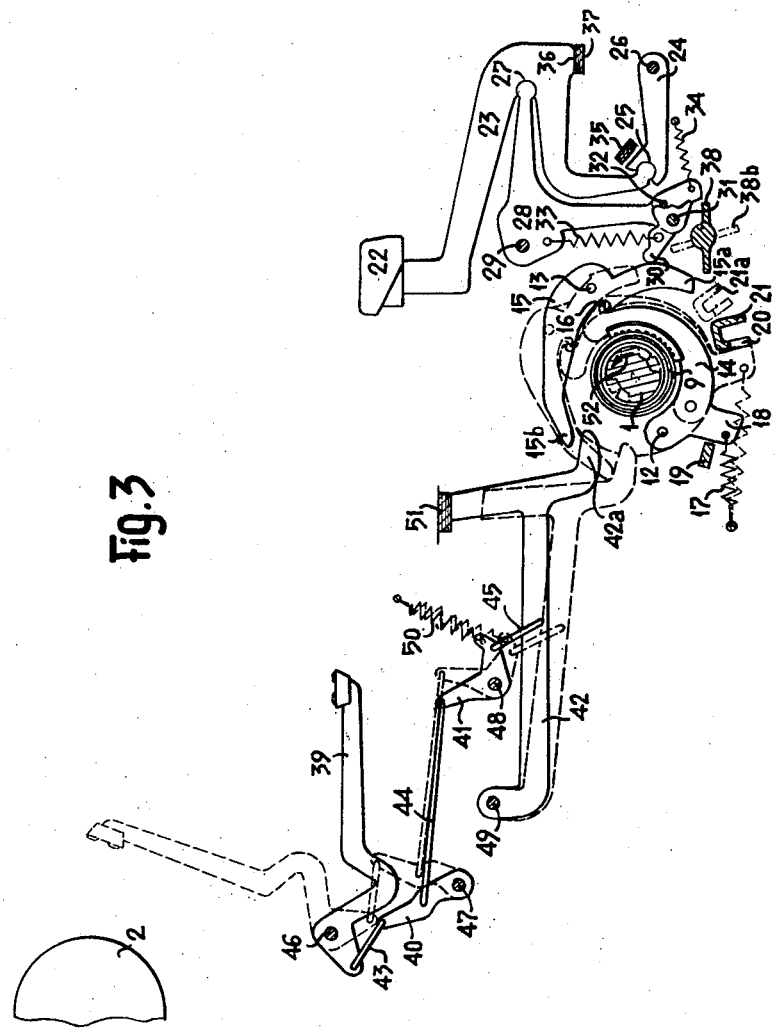

United States Patent Office 2,902,131
Patented Sept. 1, 1959

---

2,902,131

OFFICE MACHINES, PARTICULARLY TYPEWRITERS

Enzo Ascoli and Norbert Schaetti, Yverdon, Switzerland, assignors to Paillard S.A., Sainte-Croix, Switzerland, a corporation of Switzerland Application March 19, 1957, Serial No. 647,133

Claims priority, application Switzerland April 11, 1956

9 Claims. (Cl. 197—17)

The invention relates to an office machine, particularly a typewriter, comprising a shaft driven in permanent rotation and at least one element mounted concentrically on said shaft and connected to a corresponding control member, in such a manner that an action on said latter produces a friction coupling between the shaft and the said element so as to cause said latter to turn, the movement of the said element being utilised for controlling a member such as the type bar of the typewriter.

The above principle has been known for a long time and various constructional solutions have been proposed for carrying it into effect. However, all the solutions known hitherto have disadvantages due to difficulties derived from the following facts:

The element mounted concentrically to the shaft should be mounted so that said shaft can turn freely without driving said element, when its rotation with the shaft is not desired. Consequently the co-operating surfaces of the shaft and the element should have very weak coefficients of friction in relation to each other. Further, the said surfaces should have a very high resistance to wear, by reason of the permanent rotation of the shaft. On the contrary, when it is desired to drive the element by the shaft, which in accordance with the principle referred to, is obtained by frictional engagement between the shaft and the element, the co-operating surfaces of said latter should have high coefficients of friction, in order to make it possible to obtain positive coupling action with the available forces. The use of exaggerated forces, in order to compensate the absence of sufficient coefficients of friction inevitably leads to possible jamming of parts and premature wear.

It is obvious that the same surfaces could not have, in the various phases of their operation, different characteristics as regards the coefficient of friction and resistance to wear, and that any compromise, of the type proposed in known constructions which attempts to satisfy the requirements of operation referred to above, has as a consequence, an uncertainty of operation, which is a serious inconvenience.

In the machine according to the present invention, this inconvenience is eliminated by the fact that a ring-like support member, secured in rotation with the shaft, is interposed between the shaft and the said element, said support member having at least two different surfaces of revolution, one adapted to carry or support the element and having a low coefficient of friction, the other having a high coefficient of friction provided for permitting the said coupling between the shaft and the element, the two surfaces having, under conditions of operation suitable for each thereof, a high resistance to wear.

In the accompanying drawings is shown diagrammatically and by way of example a form of construction of the subject of the invention, wherein:

Fig. 1 is a side view of the typing mechanism of the machine, in the rest position, some of the parts being in section or broken away.

Fig. 2 is a section on the line II—II of Fig. 1.

Fig. 3 is also a side view showing two positions of operation of the mechanism.

As will be seen in the drawings, the machine comprises a shaft 1 located parallel to the platen 2 and driven in permanent rotation by an electric motor (not shown), said shaft 1 comprising two axial grooves 3 and 4 which are diametrically opposed. A ring 5, provided in the interior with two teeth 6 and 7, is threaded on the shaft 1, the teeth 6 and 7 engaging with grooves 3 and 4 respectively, and thus rendering the ring 5 angularly secured to the shaft 1. As will be seen in Fig. 2, the ring 5 comprises, at the middle portion of its periphery an enlargement 8 surrounded by a rubber lining 9. At each side of the annular part 8, the ring 5 carries a flange 10, 11 respectively. Said latter are connected together by rivets 12 and 13 (Fig. 1) and enclose between them a shoe 14 and a two-armed lever 15 capable of pivoting respectively on the rivets 12 and 13 and hinged one to the other at 16. The assembly comprising the two flanges 10 and 11, the shoe 14 and the lever 15 thus forms an element mounted concentrically to the shaft 1 and capable of turning freely on the ring 5 interposed between the shaft and the said element. A spring 17 attached to a lug 18 of the shoe 14 maintains the said element in the normal inoperative position, which position is determined by the said lug 18 bearing against a stop 19. The extreme angular or operative position of the said element, opposite to the said normal position of rest, is restricted by the abutment of the lug 18 against a stop or tongue 20 of a transverse member 21 located parallel to the shaft 1.

A key 22 is secured to the end of a bent lever 23 of which the other end is hinged at 25 to another lever 24 pivoted at 26. The bent lever 23 is also hinged at 27 to the end of an arm of a bent lever 28, pivoted at 29 and at which the other arm carries a pawl 30 capable of pivoting at 31 and held against a nipple 32 by a spring 33. The lever 28 is subjected to the action of a spring 34 tending to cause it to turn in an anti-clockwise direction in such a manner as to maintain the key 22 in the normal position, which position is determined by the stop of the lever 24 against a cushion 35. The lower extreme position of the key 22, when it is depressed against the action of the spring 34, is determined by the abutting of the part 36 of the lever 23 against another cushion 37. A bar 38, located underneath the pawl 30 and passing across the whole of the machine in the manner of a universal bar, may be placed at will in its position shown in full lines in Fig. 1 and in the positions 38a (Fig. 1) and 38b (Fig. 3) by means of a control member, not shown.

The typing mechanism of the machine according to the invention comprises, in the known manner, a type bar 39 and intermediate levers 40, 41 and 42, connected together by rods 43, 44 and 45 and respectively pivoted at 46, 47, 48 and 49. A return spring 50 acting on the lever 41, maintains the whole of this assembly in the normal position, which position is determined by the stop of the lever 42 against a cushion 51.

The typing mechanism above described operates in the following manner:

While the various members are in the position shown in Fig. 1, the ring 5, driven in rotation by the shaft 1, which rotates in the direction indicated by the arrow 52, can turn freely in the interior of the flanges 10 and 11 by reason of slight coefficients of friction presented by the cylindrical surfaces of the flanges and of the ring.

When it is desired to type, the key 22 is lowered until the part 36 of the lever 23 abuts against the cushion 37. The lowering of the key 22 causes, through the medium of the hinge 27, the pivoting, in a clockwise direction, of the lever 28 on its pivot 29, against the action of the spring 34, and consequently thrusts the pawl 30 against the end 15a of the lever 15. The latter thus pivots on the rivet 13 and produces, through the medium of the hinge 16, the tightening of the shoe 14 against the rubber lining 9 of the ring 5, thus effecting the coupling of said ring and, consequently, of the shaft 1, with the element mounted concentrically on the latter and comprising the two flanges 10 and 11, the shoe 14 and the lever 15. The position occupied by the members of the typing mechanism immediately after the lowering of the key 22, is shown in full lines in Fig. 3. From this moment the said element is driven in rotation in the direction of the arrow 52, so that the end 15b of the lever 15, moves to engage the bent end 42a of the lever 42, causing the latter to pivot against the action of the return spring 50 and the inertia of the rod 39. The resistance met by the lever 15 tends to cause it to turn in a clockwise direction about the rivet 13, which ensures the continuity of the pressing of the shoe 14 against the lining 9. This continuous rotation and, consequently, the driving of the assembly of levers 42, 41, 40, and of the rod 39, until the lug 18 abuts against the tongue 20, thus produces the release of the shoe 14 from the lining 9 and the return of the concentric element into its rest position under the action of the spring 17, while the rod 39 continues its rapid movement up to the platen 2, so as to effect typing. The position of the typing mechanism at the moment of impact of the lug 18 against the tongue 20 is shown in broken lines in Fig. 3.

In the case in which the key 22 has not been released before the return of the element into the normal position, the end 15a of the lever 15 will follow its normal path of travel by causing the pawl 30 to pivot against the action of the spring 33. When the key is released, the pawl resumes the position shown in the drawing.

On the contrary, when the bar 38 is not in its normal position but in the position 38b (Fig. 3), free pivoting of the pawl 30 is no longer possible, thus causing the stopping of the element in an intermediate position in which the end 42a of the lever 42, during the return to rest of the latter, strikes the end 15b of the lever 15, and causes the latter to pivot. This pivoting action of lever 15 again effects the tightening of the shoe 14 against the lining 9, thus producing the rotation of the element and the driving of the rod 39 for fresh typing. This operation is repeated as long as the key 22 is not released. Consequently, the position 38b of the bar 38 is used for repeated and automatic typing.

The position 38a (Fig. 1) of the bar 38, is provided for locking the key at the end of a line. In fact the pivoting of the lever 28 being no longer possible, the lowering of the key 22 cannot be effected.

The force of typing can be adjusted, on the one hand, by folding the tongue 20 (separate adjustment), and on the other hand, by the movement of the transverse member 21 (collective adjustment). Thus, for increasing the typing force, the transverse member can be moved into the position 21a (Fig. 3).

It will be understood that the device according to the invention, used in the above example for typing mechanism, may also be used for mechanism fulfilling other functions in the machine, such as: spacing, backward return, motion and so forth. It suffices to cause the lever 15 to co-operate with the mechanism in question.

We claim:

1. An office machine, particularly a typewriter having a plurality of movable type bars, type bar operating levers, and related actuating keys, comprising a shaft driven in permanent rotation, at least one element mounted concentrically on said shaft, a control member connected to one of said keys and adapted to actuate said element, whereby action on said control member produces a friction coupling between said shaft and said element so as to cause said element to turn, the movement of the said element being utilised for controlling one of said type bars, a support member secured in rotation with said shaft, said support member being interposed between said shaft and said element, and having at least two different surfaces of revolution, one of said surfaces adapted to carry said element and having a low coefficient of friction, the other of said surfaces having a high coefficient of friction to permit coupling engagement between said shaft and said element, said two surfaces having, under conditions of operation suitable for each thereof, a high resistance to wear.

2. A machine according to claim 1, wherein said support member comprises a ring secured to said shaft so as to rotate therewith, the periphery of said ring carrying a lining of a material having a high coefficient of friction, said lining constituting said surface provided for permitting the coupling between said shaft and said element, said ring having two surfaces of revolution located respectively on oppoiste sides of said lining and adapted to carry the said element.

3. A machine according to claim 2, wherein said element is formed by two flanges secured one to the other and capable of turning freely on said surfaces of revolution of said ring, on opposite sides of said lining.

4. A machine according to claim 3, wherein said element includes a shoe and lever, said shoe and said lever located between said flanges and pivoted thereon, said lever having two arms adapted to co-operate with both said control member and said type bar operating lever, said two armed lever co-operating with said shoe in such a manner as to cause the tightening of said shoe against said lining when said lever pivots in a determined direction.

5. A machine according to claim 4, wherein said shoe is provided with a lug, and a stop member is provided to co-operate with said lug during the rotation of said element to cause the stopping of said element and the releasing of said shoe.

6. A machine according to claim 5, wherein said control member comprises a pawl pivotally mounted on the end of a lever, a spring holding said pawl against a stop secured to said lever, said lever being connected to a key of the machine, in such a manner that the depression of the key produces the pivoting of the said lever and urges said pawl against an arm of said two-armed lever, whereby said two-armed lever is caused to pivot in the direction causing coupling engagement between said shaft and said element.

7. A machine according to claim 6, comprising a movable stop, the position of said stop causing the locking of said pawl in its operative position in such a manner as to prevent it from being moved away from this position under the action of the cooperating arm of said two-armed lever opposing the action of said spring.

8. An office machine, particularly a typewriter, including a platen, a plurality of keys, key levers, type bars, and type bar operating levers, means for operating said type bars through actuation of said keys comprising; a shaft driven in permanent rotation, a support member secured to said shaft for rotation therewith, at least one element carried by said support member and mounted concentrically to said shaft, said element comprising two flanges secured to each other, a shoe and a two-armed lever located between said flanges and pivoted thereon, said support member having at least two different surfaces of revolution, one of said surfaces having a low coefficient of friction and adapted to carry said element, the other of said surfaces having a high coefficient of friction to permit coupling engagement between said shaft and said element, a control member connected to one of said keys and adapted to actuate said element, whereby action on said control member through said key produces a friction coupling between said shaft and said element causing said two-armed lever of said element to turn and engage one of said type bar levers thereby effecting printing operation of a related type bar, and means for releasing said element from coupling engagement with said shaft.

9. A machine according to claim 8, wherein the means for releasing said element comprises a lug carried by said shoe, and a stop located in the path of travel of said lug, said stop being selectively adjustable relative to said lug to vary the force of movement of a type bar striking the platen.

References Cited in the file of this patent

UNITED STATES PATENTS 1,480,698     Shiek _____ Jan. 15, 1924